United States Patent
Shimizu et al.

(10) Patent No.: US 10,774,194 B2
(45) Date of Patent: *Sep. 15, 2020

(54) METHOD OF SEPARATING INORGANIC MATERIAL, METHOD OF PRODUCING REPROCESSED MATERIAL AND METHOD OF REMOVING ORGANIC SUBSTANCE

(71) Applicant: HITACHI CHEMICAL COMPANY, LTD., Tokyo (JP)

(72) Inventors: Akira Shimizu, Tokyo (JP); Kazuhito Kobayashi, Tokyo (JP); Kouichi Aoyagi, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/737,175

(22) PCT Filed: Mar. 8, 2016

(86) PCT No.: PCT/JP2016/057155
§ 371 (c)(1),
(2) Date: Dec. 15, 2017

(87) PCT Pub. No.: WO2017/154098
PCT Pub. Date: Sep. 14, 2017

(65) Prior Publication Data
US 2018/0371204 A1    Dec. 27, 2018

(51) Int. Cl.
| C08J 11/18 | (2006.01) |
| C08J 11/16 | (2006.01) |
| B29B 17/02 | (2006.01) |
| C08J 11/24 | (2006.01) |
| C08J 5/04 | (2006.01) |
| C08K 7/04 | (2006.01) |

(52) U.S. Cl.
CPC .............. *C08J 11/18* (2013.01); *B29B 17/02* (2013.01); *C08J 5/042* (2013.01); *C08J 11/16* (2013.01); *C08J 11/24* (2013.01); *B29B 2017/0293* (2013.01); *C08J 2300/22* (2013.01); *C08J 2300/24* (2013.01); *C08J 2400/22* (2013.01); *C08J 2463/00* (2013.01); *C08J 2467/00* (2013.01); *C08K 7/04* (2013.01); *Y02W 30/622* (2015.05); *Y02W 30/705* (2015.05); *Y02W 30/706* (2015.05)

(58) Field of Classification Search
CPC .. B29B 17/02; B29B 2017/0293; C08J 11/16; C08J 11/18; C08J 2300/22; C08J 2463/00; C08J 2467/00; C08J 5/042; C08K 7/04; Y02W 30/622; Y02W 30/705; Y02W 30/706
See application file for complete search history.

(56) References Cited

U.S. PATENT DOCUMENTS 4,983,549 A    1/1991    Greve

FOREIGN PATENT DOCUMENTS

| JP | H02-121806 A | 5/1990 |
| JP | H11-21373 A | 1/1999 |
| JP | 2001-172426 A | 6/2001 |
| JP | 2002-145931 A | 5/2002 |
| JP | 2002-194137 A | 7/2002 |
| JP | 2013-006948 A | 1/2013 |
| JP | 2013-234240 A | 11/2013 |
| WO | 2014/098229 A | 6/2014 |

OTHER PUBLICATIONS

Machine translation of JP 2013-234240, Sato et al, Nov. 21, 2013.*
International Search Report for PCT/JP2016/057155 dated Jun. 14, 2016; English translation submitted herewith (5 pages).

* cited by examiner

*Primary Examiner* — Frances Tischler
(74) *Attorney, Agent, or Firm* — Fitch, Even, Tabin & Flannery, L.L.P.

(57) ABSTRACT

A method of separating an inorganic material, the method comprising in the following order: a contact process of contacting a processing solution with a composite material, the composite material including a first organic substance that is decomposable by the processing solution, a second organic substance that is not decomposable by the processing solution, and an inorganic material; a separation process of separating the processing solution including a decomposition product of the first organic substance, from a recovered product including the inorganic material and the second organic substance; and a thermal treatment process of subjecting the recovered product to a thermal treatment at a temperature that is equal to or greater than a temperature at which the second organic substance is eliminated.

16 Claims, No Drawings

METHOD OF SEPARATING INORGANIC MATERIAL, METHOD OF PRODUCING REPROCESSED MATERIAL AND METHOD OF REMOVING ORGANIC SUBSTANCE

CROSS-REFERENCE TO RELATED APPLICATIONS

This application is a U.S. national phase application filed under 35 U.S.C. § 371 of International Application No. PCT/JP2016/057155, filed Mar. 8, 2016, designating the United States, which is hereby incorporated herein by reference in its entirety.

TECHNICAL FIELD

The invention relates to a method of separating an inorganic material, a method of producing a reprocessed material and a method of removing an organic substance.

BACKGROUND ART

Composite materials of an organic substance such as a resin and an inorganic material such as carbon are used in various fields. Examples of the composite materials include a carbon fiber reinforced plastic (CFRP) including a resin and carbon fibers, a glass fiber reinforced plastic (GFRP) including a resin and glass fibers, a mold coil including a resin and a metal member, and a motor coil including a varnish and a conductive coil.

In view of a recent increase in the disposal amount of used composite materials, development of a technique of reprocessing and reusing the same has been considered. For example, a method of collecting an inorganic material from a composite material by decomposing a resin in the composite material with a processing solution including a decomposition catalyst and an organic solvent, and separating the resin with the processing solution from the inorganic material, has been proposed as a method of reusing an inorganic material in a composite material including an epoxy resin or a polyester resin and an inorganic material (see, for example, Japanese Patent Application Laid-Open (JP-A) Nos. 2001-172426 and 2002-194137).

PROBLEM TO BE SOLVED BY THE INVENTION

The method described in (JP-A) Nos. 2001-172426 and 2002-194137 is effective when the organic substance in the composite material is decomposable with a processing solution. However, a composite material may include an organic substance that does not decompose with a processing solution (such as, for example, a thermoplastic resin) for the purpose of improving properties thereof or the like. When such a component remains in a collected product without being separated, the quality of the inorganic material may not satisfy the required standards for reprocessed products.

In view of the above, the invention aims to provide a method of separating an inorganic material, a method of producing a reprocessed material and a method of removing an organic substance, in which an organic substance is removed with an excellent removing performance.

MEANS FOR SOLVING THE PROBLEM

The concrete means for solving the problem include the following embodiments.

<1> A method of separating an inorganic material, the method comprising in the following order:
a contact process of contacting a processing solution with a composite material, the composite material including a first organic substance that is decomposable by the processing solution, a second organic substance that is not decomposable by the processing solution, and an inorganic material;
a separation process of separating the processing solution including a decomposition product of the first organic substance, from a recovered product including the inorganic material and the second organic substance; and a thermal treatment process of subjecting the recovered product to a thermal treatment at a temperature that is equal to or greater than a temperature at which the second organic substance is eliminated.

<2> The method of separating an inorganic material of <1>, wherein the thermal treatment process comprises adjusting a temperature for the thermal treatment to from 350° C. to 450° C.

<3> The method of separating an inorganic material of <1> or <2>, wherein the first organic substance comprises a resin including an ester bond.

<4> The method of separating an inorganic material of any one of <1> to <3>, wherein the second organic substance comprises a thermoplastic resin.

<5> The method of separating an inorganic material of any one of <1> to <4>, wherein the inorganic material comprises a fibrous inorganic material.

<6> The method of separating an inorganic material of any one of <1> to <5>, wherein the processing solution includes an organic solvent and a decomposition catalyst.

<7> A method of producing a reprocessed material, the method comprising in the following order:
a contact process of contacting a processing solution with a composite material, the composite material including a first organic substance that is decomposable by the processing solution, a second organic substance that is not decomposable by the processing solution, and an inorganic material;
a separation process of separating the processing solution including a decomposition product of the first organic substance, from a recovered product including the inorganic material and the second organic substance; and a thermal treatment process of subjecting the recovered product to a thermal treatment at a temperature that is equal to or greater than a temperature at which the second organic substance is eliminated, and obtaining the inorganic material as a reprocessed material.

<8> The method of producing a reprocessed material of <7>, wherein the thermal treatment process comprises adjusting a temperature for the thermal treatment to from 350° C. to 450° C.

<9> The method of producing a reprocessed material of <7> or <8>, wherein the first organic substance comprises a resin including an ester bond.

<10> The method of producing a reprocessed material of any one of <7> to <9>, wherein the second organic substance comprises a thermoplastic resin.

<11> The method of producing a reprocessed material of any one of <7> to <10>, wherein the inorganic material comprises a fibrous inorganic material.

<12> The method of producing a reprocessed material of any one of <7> to <11>, wherein the processing solution includes an organic solvent and a decomposition catalyst.

<13> A method of removing an organic substance, the method comprising: a thermal treatment process of subjecting an inorganic material to a thermal treatment, the inorganic material including a fiber that does not form a strand and an organic substance that is attached to the inorganic material, at a temperature that is equal to or greater than a temperature at which the organic substance is eliminated.

<14> The method of removing an organic substance of <13>, wherein the inorganic material includes an inorganic material retrieved from a composite material.

<15> The method of removing an organic substance of <13> or <14>, wherein the organic substance includes a thermoplastic resin.

EFFECT OF THE INVENTION

According to the invention, a method of separating an inorganic material, a method of producing a reprocessed material and a method of removing an organic substance, in which an organic substance is removed with an excellent removing performance, are provided.

EMBODIMENTS FOR IMPLEMENTING THE INVENTION

In the following, the embodiments for implementing the invention are explained. However, the invention is not limited to the embodiments. The elements of the embodiments (including steps) are not essential, unless otherwise stated. The numbers and the ranges thereof do not limit the invention as well.

In the specification, the "process" refers not only to a process that is independent from the other steps, but also to a step that cannot be dearly distinguished from the other steps, as long as the aim of the process is achieved.

In the specification, the numerical range represented by from A to B includes A and B as a maximum value and a minimum value, respectively.

In the specification, the minimum and maximum values of one of the numerical ranges described in a gradual manner may be replaced by the minimum and maximum values of the other numerical range, or may be replaced by the corresponding values shown in the Examples.

In the specification, when there is more than one kind of substance corresponding to a component of a composition, the content of the component refers to a total content of the substances, unless otherwise stated.

In the specification, when a composition includes more than one kind of particles, the particle size of the particles refers to a particle size of a mixture of the particles in the component, unless otherwise stated.

In the specification, a "layer" may be formed over an entire region or may be formed over part of a region, upon observation of the region.

<Method of Separating Inorganic Material>

The method of separating an inorganic material includes in the following order: a contact process of contacting a processing solution with a composite material, the composite material including a first organic substance that is decomposable by the processing solution, a second organic substance that is not decomposable by the processing solution, and an inorganic material;

a separation process of separating the processing solution including a decomposition product of the first organic substance, from a recovered product including the inorganic material and the second organic substance; and a thermal treatment process of subjecting the recovered product to a thermal treatment at a temperature that is equal to or greater than a temperature at which the second organic substance is eliminated.

According to the method, an organic substance can be removed from an inorganic material with high efficiency, in a composite material, even if the organic substance is not decomposable with a processing solution.

Specifically, even if a recovered product includes an inorganic material and an organic substance that is not decomposable by the processing solution, the organic substance can be removed from a recovered product by performing a thermal treatment at a temperature that is equal to or greater than a temperature at which the organic substance is eliminated.

In a case in which a second organic substance exists in a first organic substance in the form of domains, the second organic substance is removed together with the surrounding first organic substance upon decomposition of the first organic substance. In that case, reattachment of the organic substance to the inorganic material in the separation process by adjusting the temperature of the processing solution to be equal to or greater than a softening point of the second organic substance.

In the specification, the decomposition of an organic substance refers to changing the molecular structure of the organic substance to a size that is small enough to be incorporated into a processing solution.

(Composite Material)

The composite material to which the method is applicable is not specifically limited as long as it includes a first organic substance that decomposes with a processing solution used in the method, a second organic substance that does not decompose with the processing solution, and an inorganic material. Specific examples of the composite material include CFRP, GFRP, a mold coil and a motor coil.

The first organic substance and the second organic substance included in the composite material may be in a state of fully cured or not fully cured (semi-cured). For example, when a composite material is in a state of a prepreg, i.e., fibers of glass or carbon are impregnated with a resin, the composite material may be B stage or C stage.

Examples of the first organic substance include a resin. When the first organic substance is a resin, it may be a thermosetting resin or a thermoplastic resin. The resin may be in a state of fully cured or solidified, or may not be in a state of fully cured or solidified.

When the first organic substance is a resin, its type is not specifically limited and may be selected depending on the conditions such as the type of the processing solution, the processing temperature and the processing time. From the viewpoint of decomposability with the processing solution, a resin having an ester bond is preferred. Examples of the resin having an ester bond include a polyester resin (such as an unsaturated polyester resin and a saturated polyester resin) and an epoxy resin having an ester bond (such as an epoxy resin cured with an acid anhydride and a glycidyl ester-type epoxy resin). The composite material may include a single kind of the first organic substance or two or more kinds of the first organic substance.

Examples of the second organic substance include a resin that can be eliminated by thermal treatment. The second organic substance may be dispersed in the first organic substance, mixed with the first organic substance, form a different member from the first organic substance, or may be in any other state.

When the second organic substance is a resin that can be eliminated by thermal treatment, the type of the thermoplastic resin is not particularly limited. Examples of the thermoplastic resin include a polyolefin resin and a polyamide resin. The composite material may include a single kind of the second organic substance or two or more kinds of the second organic substance. Examples of the polyolefin resin include polypropylene and polyethylene. Examples of the polyamide resin include nylon 6 and nylon 6,6.

Examples of the inorganic material in the composite material include carbon, glass, ceramics, metal, semiconductors and the like. The form of the inorganic material in the composite material is not particularly limited, and examples thereof include a fiber, a cloth, a particle, a layer, a plate and a rod. The composite material may include a single kind of the inorganic material or two or more kinds of the inorganic material.

The shape of the composite material is not particularly limited. For example, the composite material may be in the form of a sheet or any other desired shape. The composite material may be cut depending on the desired length or size of the inorganic material to be separated from the composite material.

In an embodiment, the composite material includes a fibrous inorganic material (such as carbon fibers), a resin including an ester bond as a first organic substance (such as an epoxy resin), and a thermoplastic resin not including an ester bond (such as a polyolefin resin).

(Processing Solution)

The processing solution used in the method is not particularly limited, as long as it is capable of decomposing the first organic substance in the composite material to be used in the method. For example, when the first organic substance includes a resin including an ester bond, it is preferred to use a processing solution that causes decomposition of an ester bond. Examples of the processing solution that causes decomposition of an ester bond include a processing solution including an organic solvent and a decomposition catalyst.

When the processing solution includes an organic solvent, the type of the organic solvent is not particularly limited, and examples thereof include an alcohol solvent, a ketone solvent, an ether solvent, an amide solvent, and an ester solvent.

Examples of the alcohol solvent include methanol, methanol, ethanol, 1-propanol, 2-propanol, 1-butanol, 2-butanol, isobutanol, tert-butanol, 1-pentanol, 2-pentanol, 3-pentanol, 2-methyl-1-butanol, isopentyl alcohol, tert-pentyl alcohol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, cyclohexanol, 1-methyl cyclohexanol, 2-methyl cyclohexanol, 3-methyl cyclohexanol, 4-methyl cyclohexanol, ethylene glycol, ethylene glycol monomethyl ether, ethylene glycol monoethyl ether, ethylene glycol monopropyl ether, ethylene glycol monobutyl ether, diethylene glycol, diethylene glycol monomethyl ether, diethylene glycol monoethyl ether, diethylene glycol monopropyl ether, diethylene glycol monobutyl ether, triethylene glycol, triethylene glycol monomethyl ether, triethylene glycol monoethyl ether, tetraethylene glycol, polyethylene glycol (Mw: from 200 to 400), 1,2-propane diol, 1,3-propane diol, 1,2-propane diol, 1,3-butane diol, 1,4-butane diol, 2,3-butane diol, 1,5-pentane diol, glycerin, dipropylene glycol, and benzyl alcohol.

Examples of the ketone solvent include acetone, methyl ethyl ketone, 2-pentanone, 3-pentanone, 2-hexanone, methyl isobutyl ketone, 2-heptanone, 4-heptanone, diisobutyl ketone, cyclohexanone, methyl cyclohexanone, phorone, isophorone acetyl acetone, and acetophenone.

Examples of the ether solvent include dipropyl ether, diisopropyl ether, dibutyl ether, dihexyl ether, anisole, phenetol, dioxane, tetrahydrofuran, acetal, ethylene glycol dimethyl ether, ethylene glycol diethyl ether, diethylene glycol dimethyl ether, diethylene glycol monomethyl ether, diethylene glycol monobutyl ether, and diethylene glycol diethyl ether.

Examples of the amide solvent include formamide, N-methyl formamide, N,N-dimethyl formamide, N,N-diethyl formamide, acetamide, N-methyl acetamide, N,N-dimethyl acetamide, N,N,N',N'-tetramethyl urea, 2-pyrolidone, N-methyl-2-pyrolidone, caprolactam, and a carbamic acid ester.

Examples of the ester solvent include methyl formate, ethyl formate, propyl formate, butyl formate, isobutyl formate, pentyl formate, methyl acetate, ethyl acetate, propyl acetate, isopropyl acetate, butyl acetate, isobutyl acetate, pentyl acetate, isopentyl acetate, 3-methoxybutyl acetate, 2-ethylbutyl acetate, 2-ethylhexyl acetate, cyclohexyl acetate, benzyl acetate, methyl propionate, ethyl propionate, butyl propionate, isopentyl propionate, methyl lactate, ethyl lactate, butyl lactate, methyl butyrate, ethyl butyrate, butyl butyrate, isopentyl butyrate, isobutyl isobutyrate, ethyl isovalerate, isopentyl isovalerate, methyl benzoate, ethyl benzoate, propyl benzoate, butyl benzoate, γ-butyrolactone, diethyl oxalate, dibutyl oxalate, diethyl malonate, methyl salicylate, ethylene glycol diacetate, tributyl borate, trimethyl phosphate, and triethyl phosphate.

In view of the resistance to denaturation, the organic solvent is preferably an alcohol solvent, more preferably at least one selected from the group consisting of benzyl alcohol and 1,4-butandiol, further preferably benzyl alcohol. The processing solution may include a single kind of the organic solvent or two or more kinds of the organic solvent.

The boiling point of the processing solution is not particularly limited, and may be selected depending on the type of the first organic substance included in the composite material. Specifically, the boiling point of the processing solution is selected in a range of from a temperature at which the first organic substance decomposes to a temperature equal to a softening point of the second organic substance.

When the processing solution includes a decomposition catalyst, examples of the decomposition catalyst include an alkali metal compound, such as a phosphoric salt, and a metallic hydroxide. Examples of the phosphoric salt include tripotassium phosphate, trirubidium phosphate, trisodium phosphate, and trilithium phosphate. Examples of the metallic hydroxide include rubidium hydroxide, potassium hydroxide, sodium hydroxide and lithium hydroxide.

In view of safety, the decomposition catalyst is preferably a phosphoric salt, more preferably a tripotassium phosphate. The processing solution may include a single kind of the decomposition catalyst, or two or more kinds of the decomposition catalyst. The concentration of the decomposition catalyst is not particularly limited, and may be from 5% by mass to 40% by mass of the processing solution, for example.

(Contact Process)

In the contact process, the processing solution is contacted with a composite material that includes a first organic substance that decomposes with the processing solution, the second organic substance that does not decompose with the processing solution, and an inorganic material. The method for the contacting is not particularly limited, and examples thereof include a method of immersing the composite material in the processing solution, and a method of spraying or coating the composite material with the processing solution.

From the viewpoint of decomposing the first organic substance and incorporating the decomposition product into the processing solution with high efficiency, a method of immersing the composite material in the processing solution is preferred.

From the viewpoint of promoting the decomposition of the first organic substance in the composite material, the processing solution is preferably flowing while contacting the composite material. The method for allowing the processing solution to flow may be, for example, a method of immersing the composite material with the processing solution in a container equipped with a tube to allow the processing solution to flow in and a tube to allow the processing solution to flow out. The direction for the processing solution to flow is not particularly limited, and may be in a horizontal direction or in a gravitational direction, for example.

In the contact process, the time for the processing solution to be in contact with the composite material is not particularly limited, and may be from 60 minutes to 600 minutes, more preferably from 90 minutes to 240 minutes, for example.

In view of the reaction rate, the upper limit of the temperature of the processing solution may be from (A-60) ° C. to A ° C., where A is the boiling point of the processing solution, more preferably from (A-20) ° C. to (A-5) ° C. The temperature of the processing solution may remain constant or may change, during the contact process.

The contact process may include a first step, in which the processing solution has a temperature at which the curing of the resin is not accelerated, and a second step, in which the temperature of the processing solution is higher than the temperature in the first step. When the resin in the composite material is not fully cured, the curing of the resin may progress to make the resin resistant to decomposition, if the temperature of the processing is high from the beginning of the contact process. Therefore, separating the contact process into the first step and the second step is effective in a case in which the resin in the composite material is not fully cured. When the contact process includes the first step and the second step, the temperature of the processing solution at each step may be selected depending on the type of the resin included in the composite material, the state of the composite material (such as a shape), the degree of curing of the resin, and the like.

The contact process may include adjusting the temperature of the processing solution to be equal to or greater than a softening point of the second organic substance. In that case, the second organic substance is softened and partially incorporated into the processing solution, and the amount of the second organic substance in the recovered product tends to decrease. As a result, removal of the second organic substance by a thermal treatment of the recovered product can be performed more efficiently. When the contact process includes adjusting the temperature of the processing solution to be equal to or greater than a softening point of the second organic substance, the term in which the processing solution has a temperature of equal to or greater than a softening point of the second organic substance may be the entire period of the contact process or may be part of the contact process.

In the contact process, whether or not the temperature of the processing solution is equal to or greater than the softening point of the second organic substance may be determined by whether or not the temperature of the processing solution is equal to or greater than a softening point of a component included as the second organic substance, if the component is known. Alternatively, when the second organic substance is separated from the inorganic material and incorporated in the processing solution (i.e., reattachment of the second organic substance to the inorganic material does not occur), it is possible to determine that the temperature of the processing solution is equal to or greater than the softening point of the second organic substance.

(Separation Process)

In the separation process, the processing solution including a decomposition product of the first organic substance is separated from a recovered product including the inorganic material and the second organic substance.

The method for separating the processing solution including a decomposition product of the first organic substance from a recovered product including the inorganic material and the second organic substance is not particularly limited. For example, when the contact process is conducted in a container, the processing solution may be taken from the container prior to the inorganic material, or the recovered product may be taken from the container prior to the processing solution.

The temperature of the processing solution in the separation process is not particularly limited. For example, the temperature of the processing solution may be from (A-60) ° C. to A ° C., where A is the boiling point of the processing solution, preferably from (A-20) ° C. to (A-5) ° C. The temperature of the processing solution may remain constant or may change, during the contact process.

The separation process may include adjusting the temperature of the processing solution to be equal to or greater than the softening point of the second organic substance. In that case, the second organic substance is softened and partially incorporated into the processing solution, and the amount of the second organic substance in the recovered product tends to decrease. As a result, removal of the second organic substance by a thermal treatment of the recovered product can be performed more efficiently. When the separation process includes adjusting the temperature of the processing solution to be equal to or greater than a softening point of the second organic substance, the term in which the processing solution has a temperature of equal to or greater than a softening point of the second organic substance may be the entire period of the separation process or may be part of the separation process.

In the separation process, whether or not the temperature of the processing solution is equal to or greater than the softening point of the second organic substance may be determined by whether or not the temperature of the processing solution is equal to or greater than a softening point of a component included as the second organic substance, if the component is known. Alternatively, when the second organic substance is separated from the inorganic material and incorporated in the processing solution, without reattachment of the second organic substance to the inorganic material, it is possible to determine that the temperature of the processing solution is equal to or greater than the softening point of the second organic substance.

The processing solution including a decomposition product of the first organic substance and the second organic substance after the separation process may be discarded or reused. In a case of reusing the processing solution, the processing solution may be subjected to a treatment such as removal of a decomposition product of the first organic substance or other components (e.g. a substance generated by the decomposition reaction), addition of a fresh processing solution, and the like.

(Additional Contact Process and Additional Separation Process)

The method may further include an additional contact process, in which the recovered product is contacted with an additional processing solution, and an additional separation process, in which the recovered product is separated from the additional processing solution.

When performing the additional contact process and the additional separation process, the additional contact process and the additional separation process may be performed under the same conditions for the contact process and the separation process as mentioned above, or may be performed under the different conditions. The number for the additional contact process and the additional separation process to perform is not particularly limited.

The additional processing solution may be the same as the processing solution used in the contact process and the separation process, or may be different from the processing solution used in the contact process and the separation process. The specific examples and preferred embodiments of the additional processing solution are the same as that of the processing solution as mentioned above. When the first organic substance is not attached to the inorganic material or the first organic substance does not need to be further removed, the additional processing solution to be contacted to the inorganic material in the additional contact process may be capable of decomposing the first organic substance or may not be capable of decomposing the first organic substance.

(Thermal Treatment Process)

In the thermal treatment process, the recovered product that has been separated in the separation process (or an additional separation process) is subjected to a thermal treatment at a temperature that is equal to or greater than a temperature at which the second organic substance disappears. By performing a thermal treatment, the second organic substance that is attached to the inorganic material is removed, and an inorganic material suitable for recycling can be obtained.

The temperature and the time for the thermal treatment are not particularly limited, and may be selected depending on the type, state, amount of the like of the second organic substance. For example, the temperature of the thermal treatment may be from 300° C. to 450° C., preferably from 350° C. to 450° C. The time for the thermal treatment may be, for example, from 10 minutes to 240 minutes. The temperature may remain constant during the whole period of the thermal treatment process, or may change.

The thermal treatment process may be performed in the air or in an atmosphere of nitrogen, oxygen or the like. When the inorganic material is carbon fibers, in view of possible damage caused by oxygen to carbon fibers, the thermal treatment process is preferably performed in an atmosphere of nitrogen.

The elimination of the second organic substance may be determined by, in addition to visual observation, subjecting the recovered product to a further thermal treatment at a temperature at which the second organic substance is eliminated and comparing the mass of the recovered product before and after the thermal treatment. When the mass does not change during the thermal treatment, it is determined that the organic substance has been eliminated. When the mass changes during the thermal treatment, it is determined that the organic substance has not been eliminated.

The second organic substance may be completely removed from the recovered product after the thermal treatment or may partly remain in the recovered product, depending on the qualities required for the inorganic material to be used for recycling, and the like.

(Other processes)

The method may include a process other than the contact process, the separation process and the thermal treatment process, as necessary. For example, the method may include a process of washing the inorganic material after separation, or a process of subjecting the inorganic material to a surface treatment.

<Method of Producing Reprocessed Material>

The method of producing a reprocessed material, the method includes in the following order:

a contact process of contacting a processing solution with a composite material, the composite material including a first organic substance that is decomposable by the processing solution, a second organic substance that is not decomposable by the processing solution, and an inorganic material;

a separation process of separating the processing solution including a decomposition product of the first organic substance, from a recovered product including the inorganic material and the second organic substance; and a thermal treatment process of subjecting the recovered product to a thermal treatment at a temperature that is equal to or greater than a temperature at which the second organic substance is eliminated, and obtaining the inorganic material as a reprocessed material.

According to the method, an organic substance can be separated from an inorganic material in a composite material, even if the organic substance is not decomposable with the processing solution. As a result, an inorganic material as a reprocessed material that satisfies the quality for recycling can be produced with high efficiency.

The details and the preferred embodiments of the processing solution and the composite material, and the details and the preferred embodiments of the processes, are the same as that of the method of separating an inorganic material as described above.

The application for the reprocessed material produced by the method is not particularly limited. For example, the reprocessed material may be used as a raw material for a composite material with resin, a heat insulating material, a magnetic wave-shielding film, and the like.

<Method of Removing Organic Substance>

The method of removing an organic substance includes a thermal treatment process of subjecting an inorganic material to a thermal treatment, the inorganic material including a fiber that does not form a strand and an organic substance that is attached to the inorganic material, at a temperature that is equal to or greater than a temperature at which the organic substance is eliminated.

According to the method, an organic substance that is attached to an inorganic material can be removed with high efficiency. As a result, an inorganic material that satisfies the requirements for recycling can be obtained.

In the method, the technique and the specific embodiments for the thermal treatment process are not particularly limited, and may be the same as that of the thermal treatment process of the method for separating an inorganic material as described above.

The inorganic material may include a fiber that does not form a strand. When the inorganic material includes a fiber that does not form a strand, the inorganic material may include only a fiber that does not form a strand, or may further include a fiber that forms a strand. In the specification, the "fiber that does not form a strand" refers to a case in which the entire body of a fiber does not form a strand, and a case in which a portion of a fiber does not form a strand. The material for the inorganic material may be the examples of the inorganic material to be produced by the method of producing an inorganic material as described above. The inorganic material may be a single kind or a combination of two or more kinds.

Examples of the inorganic material, including a fiber that does not form a strand, include an inorganic material that is retrieved from a composite material. The fiber included in a composite material as an inorganic material is generally in a state of a strand formed of plural filaments, and is applied with a binder to maintain the state. When the binder is removed at least partially from the inorganic material, during the process of retrieving the inorganic material from the composite material, the obtained inorganic material includes a fiber that does not form a strand.

When the inorganic material is an inorganic material that is retrieved from a composite material, the method of retrieving the inorganic material from the composite material is not particularly limited. For example, the retrieval may be conducted by decomposing an organic substance such as a resin included in the composite material with a processing solution, by performing a thermal treatment at a temperature at which an organic substance is eliminated, or by any other processes.

Examples of an organic substance that is attached to an inorganic material include an organic substance that remains without detaching from an inorganic material upon retrieval of the inorganic material from the composite material, such as a thermoplastic resin as described in the method of separating an inorganic material. The organic substance that is attached to an inorganic material may be a single kind or two or more kinds.

EXAMPLES

In the following, the embodiments are described in further detail by referring to the Examples. However, the embodiments are not limited to the Examples.

Example 1

An inorganic material is separated from a composite material under the following conditions.

As the composite material, a CFRP sheet (thickness: 5 mm, resin content: 40% by mass) formed from a cured product of an epoxy resin including an ester bond (first organic substance), a polypropylene resin dispersed in the cured product of the epoxy resin (second organic substance) and carbon fibers (inorganic material) was used. As the processing solution, a mixture of benzyl alcohol and tripotassium phosphate (content of tripotassium phosphate: 10% by mass) was used.

(Contact Process)

The CFRP was contacted with the processing solution while allowing the same to flow, by immersing the CFRP in the processing solution in a container. The container had a tube for the processing solution to flow in and a tube for the processing solution to flow out, and the latter is positioned below the former in a gravitational direction such that the processing solution flows from the bottom to the top in a gravitational direction. The temperature of the processing solution was set at 190° C., and the temperature was retained at 190° C. for 120 minutes.

(Separation Process)

After the process for dissolving, the processing solution was drained from the container to separate from the carbon fibers. The temperature of the processing solution at the separation process was set at 60° C. The processing solution after the separation process included a decomposition product of the epoxy resin.

The observation found that the carbon fibers after the separation included carbon fibers that do not form a strand. The amount of the epoxy resin was small enough to reuse the carbon fibers, but the polypropylene resin was attached to the carbon fibers.

(Thermal Treatment)

The carbon fibers after the separation process were subjected to a thermal treatment in a high-temperature drier at 350° C. for 60 minutes. Then, the observation found the polypropylene resin to be eliminated.

In view of the above, the method of the embodiments exhibits an excellent removability of an organic substance from an inorganic material.

The invention claimed is:

1. A method of separating an inorganic material, the method comprising in the following order:
   a contact process of contacting a processing solution with a composite material, the composite material including a first organic substance that is decomposable by the processing solution, a second organic substance that is not decomposable by the processing solution, and an inorganic material, the temperature of the processing solution during the contact process being equal to or greater than a softening point of the second organic substance, and equal to or less than 190° C.;
   a separation process of separating the processing solution including a decomposition product of the first organic substance, from a recovered product including the inorganic material and the second organic substance; and
   a thermal treatment process of subjecting the recovered product to a thermal treatment at a temperature that is equal to or greater than a temperature at which the second organic substance is removed.

2. The method of separating an inorganic material of claim 1, further comprising recycling the inorganic material after separating the first organic substance and removing the second organic substance from the inorganic material.

3. The method of separating an inorganic material of claim 2, wherein the thermal treatment process comprises adjusting a temperature for the thermal treatment to from 350° C. to 450° C.

4. The method of separating an inorganic material of claim 2, wherein the first organic substance comprises a resin including an ester bond.

5. The method of separating an inorganic material of claim 2, wherein the second organic substance comprises a thermoplastic resin.

6. The method of separating an inorganic material of claim 5, wherein the inorganic material comprises a fibrous inorganic material.

7. The method of separating an inorganic material of claim 2, wherein the processing solution includes an organic solvent and a decomposition catalyst.

8. The method of separating an inorganic material of claim 1, wherein the second organic substance comprises polypropylene.

9. A method of producing a reprocessed material, the method comprising in the following order:
   a contact process of contacting a processing solution with a composite material, the composite material including a first organic substance that is decomposable by the processing solution, a second organic substance that is not decomposable by the processing solution, and an inorganic material, the temperature of the processing solution during the contact process being equal to or greater than a softening point of the second organic substance, and equal to or less than 190° C.;

a separation process of separating the processing solution including a decomposition product of the first organic substance, from a recovered product including the inorganic material and the second organic substance; and a thermal treatment process of subjecting the recovered product to a thermal treatment at a temperature that is equal to or greater than a temperature at which the second organic substance is removed, and obtaining the inorganic material as a reprocessed material.

10. The method of producing a reprocessed material of claim 9, further comprising recycling the inorganic material after separating the first organic substance and removing the second organic substance from the inorganic material.

11. The method of producing a reprocessed material of claim 10, wherein the thermal treatment process comprises adjusting a temperature for the thermal treatment to from 350° C. to 450° C.

12. The method of producing a reprocessed material of claim 10, wherein the first organic substance comprises a resin including an ester bond.

13. The method of producing a reprocessed material of claim 10, wherein the second organic substance comprises a thermoplastic resin.

14. The method of producing a reprocessed material of claim 10, wherein the inorganic material comprises a fibrous inorganic material.

15. The method of producing a reprocessed material of claim 10, wherein the processing solution includes an organic solvent and a decomposition catalyst.

16. A method of separating an inorganic material, the method comprising:

contacting a processing solution with a composite material including a first organic substance, a second organic substance, and an inorganic material, the first organic substance being decomposable by the processing solution, the second organic substance not being decomposable by the processing solution, the temperature of the processing solution during contacting the composite material being equal to or greater than a softening point of the second organic substance, separating the processing solution including a decomposition product of the first organic substance from the inorganic material and the second organic substance; and then thermally treating the inorganic material and the second organic substance at a temperature that is equal to or greater than a temperature at which the second organic substance is removed.

* * * * *